Jan. 30, 1923.
W. A. HOBLIT.
ADJUSTABLE WRIST PIN.
FILED FEB. 24, 1921.
1,443,534
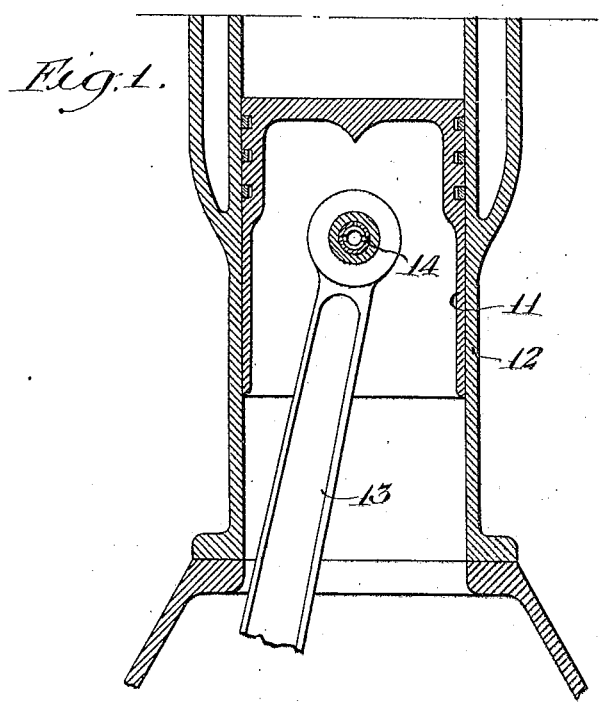
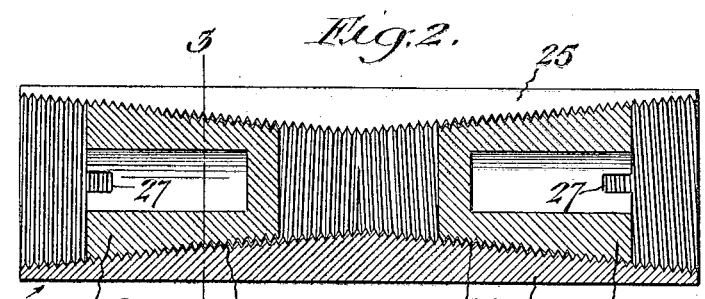
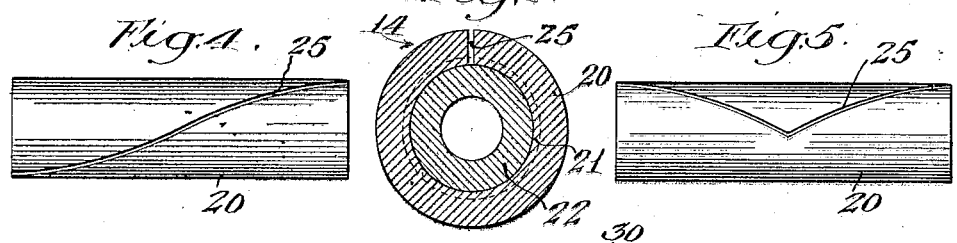
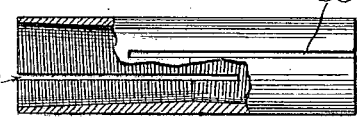
Inventor
William A. Hoblit
by Graham + Ram Patented Jan. 30, 1923.

1,443,534

UNITED STATES PATENT OFFICE.

WILLIAM A. HOBLIT, OF LOS ANGELES, CALIFORNIA.

ADJUSTABLE WRIST PIN.

Application filed February 24, 1921. Serial No. 447,372.

*To all whom it may concern:*

Be it known that I, WILLIAM A. HOBLIT, a citizen of the United States, residing at Los Angeles, county of Los Angeles, and State of California, have invented a new and useful Improvement Comprising an Adjustable Wrist Pin, of which the following is a specification.

My invention relates to pins used to provide bearings in machinery and particularly to wrist pins such as are used in internal combustion engines for the purpose of providing a pivot in the piston for the attachment of a connecting rod.

The principal object of the invention is to provide a pin which may be expanded to compensate for wear.

A further object of the invention is to provide a wrist pin which has a certain amount of elasticity to prevent seizing due to the difference in expansion and contraction of the parts under variable temperatures and in the event that the lubrication is faulty.

Further objects and advantages will be made evident hereinafter.

Referring to the drawing which is for illustrative purposes only,

Fig. 1 is a cross section through an internal combustion engine equipped with my invention.

Fig. 2 is a central longitudinal section through one embodiment of my invention, and, Fig. 3 is a section on a plane represented by the line 3—3 of Fig. 2.

Fig. 4 is an elevation of an alternate form of my invention.

Fig. 5 is an elevation of another alternate form of my invention.

Fig. 6 is an elevation partly in section of still another alternate form of my invention.

In the standard form of internal combustion engine, a piston 11 is provided sliding in a cylinder casting 12. A connecting rod 13 extends up inside the piston and engages a wrist pin 14. The embodiment of my invention to be described relates to the specific construction of this wrist pin in combination with the other parts of the engine.

In the embodiment of my invention shown in Figs. 2 and 3, 20 is a hollow cylindrical sleeve forming the wrist pin 14 and having tapered threads 21 in either end thereof. Screwed into the tapered threads 21 are plugs 22, the taper on the threaded exterior of the plug 22 being slightly greater than the taper on the interior of the member 20. The sleeve 20 is provided with a slot 25 which extends entirely through into the central cavity therein throughout its length. The sleeve 20 is used in the place of the standard wrist pin and may be arranged so that it is fixed in the connecting rod and oscillates therewith or so that it is fixed in the piston thus providing a central bearing for the connecting rod. In some forms of my invention the wrist pin is free to turn in both the piston and the connecting rod. The methods of fastening the wrist pin in the piston or in the connecting rod are not shown as they are standard in the art and various in their nature. The construction of the plugs 22 is such that the threads thereof engage firmly only near their outer ends, there being a slight clearance with the walls of the sleeve 20 at its inner ends due to the greater taper of the plugs 22. Slots 27 are provided in the plugs 22 so that they can be screwed in and out.

In practice the sleeve 20 is made of proper size to give a good working fit in the piston 11 and the connecting rod 13. After the engine has been run for a considerable period, the parts wear so that too much clearance exists around the wrist pin 14 and a slight knock may be detected by one skilled in the art. It is then possible by forcing the plugs 22 inwardly to expand the sleeve 20, increasing its effective diameter and taking up the clearance.

In practice I prefer to cut a full V thread on the exterior of the plugs 22 making a V thread of only about one third the depth of the thread on the plug 22 in the inner surface of the sleeve 20. This prevents the sleeve from being as much weakened by the threads as it would be were a full thread cut.

It should be noted that due to the form of the sleeve 20, and the plugs 22, considerable elasticity exists both in the center of the sleeve and at its ends. That is both the extreme ends and the center may be swung inwardly, the plugs 22 forming a rigid fulcrum between each and the center of the sleeve. Since this elasticity exists, the sleeve 20 is much less likely to seize in the event of changes in diameter of the sleeve or the holes in which it fits due to expansion or contraction or in the event of insufficient lubrication.

Figs. 4 and 5 show modifications in which the slots 25 do not run in a straight line but are curved as shown in those figures.

In Fig. 6 is shown a sleeve which is not cut entirely through, one slot 30 being cut in one side for about two thirds the length of the pin, a similar slot 31 being diametrically opposite the slot 30 and extending from the opposite end.

I claim as my invention:

A pin for providing a bearing surface in machines comprising: a hollow sleeve having a cut in one side thereof and frustro conical members threaded inside said sleeve for expanding said sleeve, the taper on said members being greater than the taper of the opening in which said members are secured.

In testimony whereof, I have hereunto set my hand at Los Angeles, California, this 17th day of February, 1921.

WILLIAM A. HOBLIT.